April 2, 1929.   A. F. MASURY   1,707,311
BODY FOR MOTOR VEHICLES
Filed May 19, 1924    2 Sheets-Sheet 2
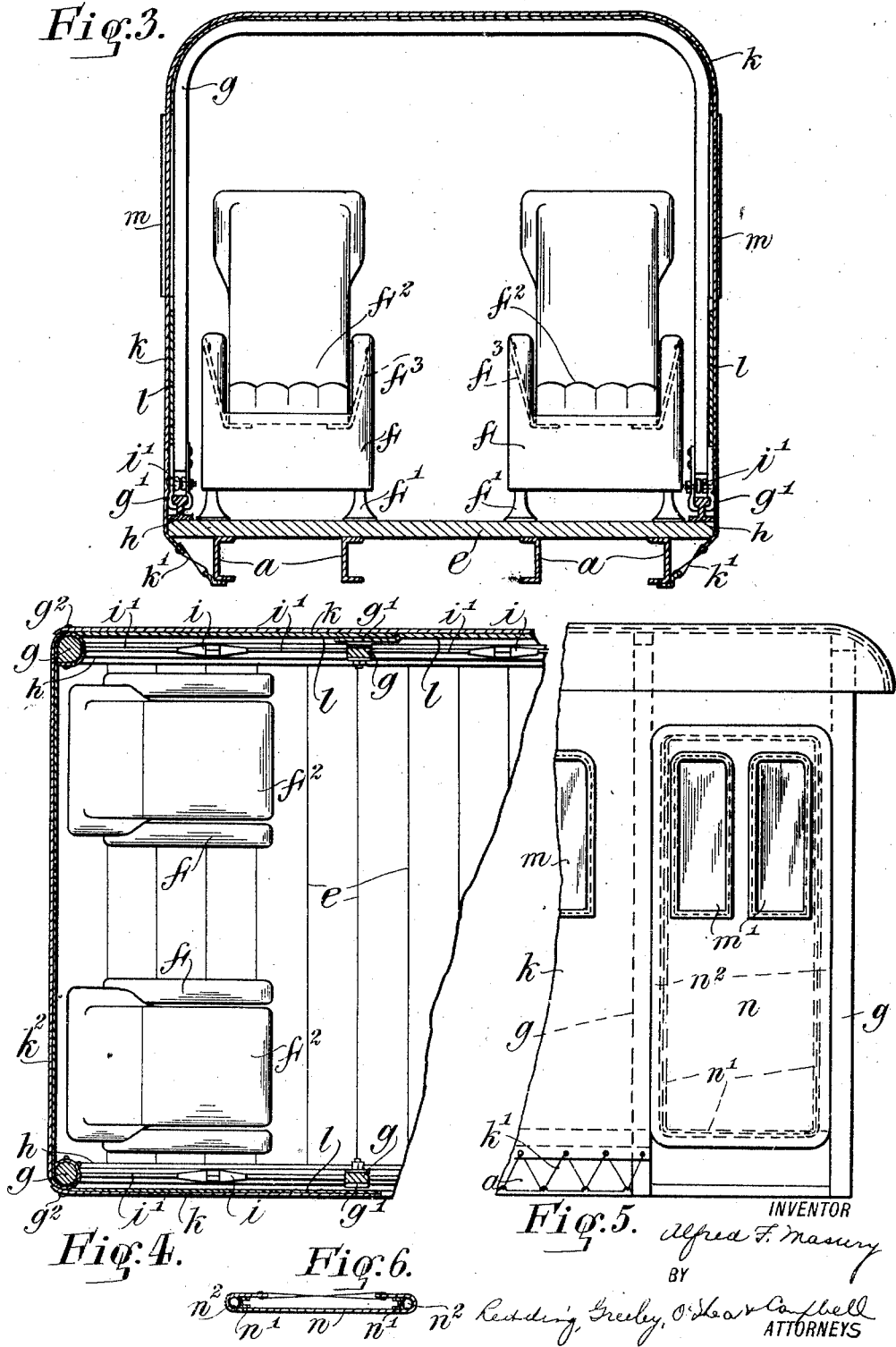

Patented Apr. 2, 1929.

1,707,311

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

BODY FOR MOTOR VEHICLES.

Application filed May 19, 1924. Serial No. 714,252.

Conditions surrounding the use of motor propelled vehicles with respect to the comfort of passengers and the mechanical strains involved differ from those of any other type of vehicle employed on roads or rails. Development in the automobile art of vehicle structures has always been premised on the provision of an inflexible chassis frame carrying an inflexible body. To attain this end the frame itself has been strongly re-enforced and the body design has involved the use of heavy stiff materials of wood and metal. In so far as contemplated by body designers flexibility in the true sense has been left out of account since a non-rigid body would give rise to cracking of paint, buckling, rattles and other noises. The present invention approaches the problem with two premises which are believed to be distinctively novel in the art, namely, a flexible chassis frame should be employed and a flexible body structure should be mounted on the non-rigid frame. In embodying such characteristics in a practicable design taking into account the comfort of the passengers the vehicle per se is viewed as a means of transportation, the weight of the passenger being carried immediately on the vehicle frame while the body covering per se is viewed merely as an enclosure for the passenger to protect him from the weather. This covering, in this aspect of design, is not applied for mechanical purposes in any sense and in fact is not adapted to do any mechanical work. Accordingly, it is mounted independent of the seats, it is within itself non-rigid and has no structural relation to the floor other than that the floor supports it. These points of demarcation are emphasized at the outset so that it may be clearly understood that the invention, while apparently of simple form in its physical embodiment, rests for its novelty on basic distinctions from any principle heretofore employed. The physical materials used may be well known but they are combined to create a vehicle having essentially different characteristics from those now known and performing each its own intended function and no other. The result is comfort for the passenger, freedom from stresses on parts and lightness in weight. In the preferred embodiment of the invention illustrated in the accompanying drawings the flexible frame carries suitable flooring on which the seats rest whereby when the frame flexes the floor may conform and the seats in which the passengers seat follow theoretically the distortion of the flooring although naturally this is considerably reduced in its transmission to the passenger. Over and about the passengers is provided a covering to protect them from the weather, this covering being of flexible material and supported by mechanical units which are so arranged as not to interfere with free flexing. Other objects of the invention incidental to the carrying out of the principal results sought for will appear as this description proceeds reference now being had to the accompanying drawings for a detailed description of one embodiment, wherein:

Figure 3 is a view in transverse section through said body.

Figure 4 is a fragmentary view in horizontal section therethrough.

Figure 5 is a detailed view in elevation showing the door.

Figure 6 is a detailed view in cross section showing one means for mounting the door without impairing the flexibility of the entire assembly.

Figure 1:
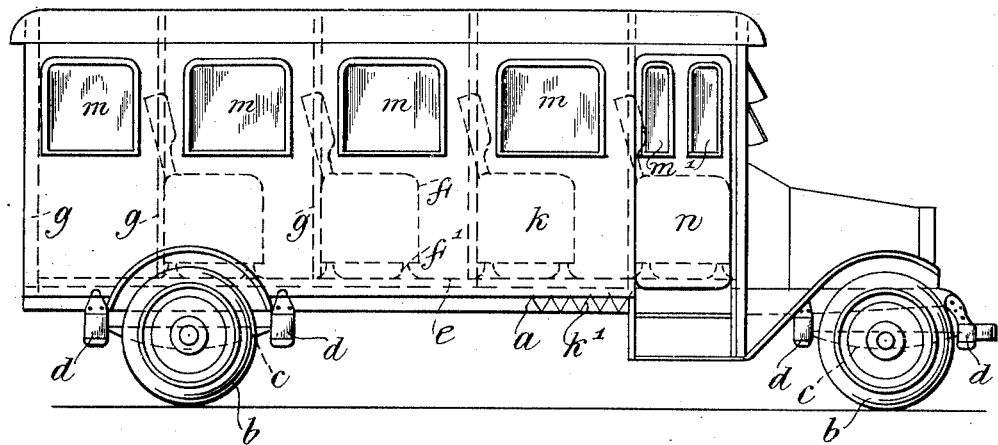
Figure 1 is a view in side elevation of a motor propelled body constructed in accordance with the invention.
Figure 2:
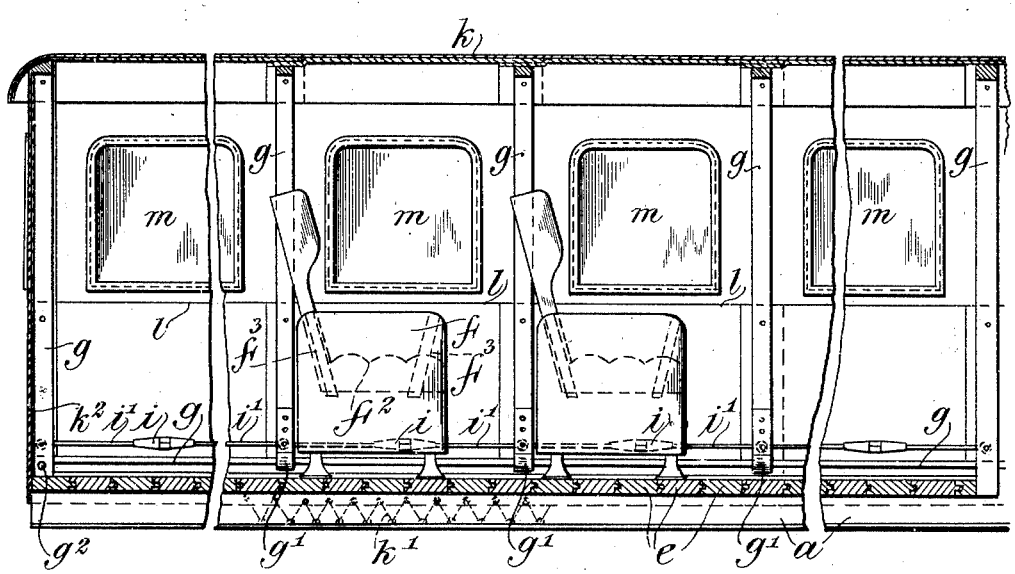
Figure 2 is a longitudinal sectional view of a fragment of the body of the bus shown in Figure 1.

The frame $a$ of the improved vehicle may include longitudinally extending channels which are tied together in such a manner as to insure a non-rigid flexible support for the vehicle body. This frame may be mounted on road wheels $b$ through springs $c$ attached thereto by cushion connections indicated at $d$. Flexibility of the frame will be least interfered with by a flooring made up of cross planks laid thereon. On this flooring rest directly chairs $f$ for the passengers which may have vacuum rubber cup supports $f'$ and a seat portion $f^2$ suspended from the chair frame proper by elastic tension members $f^3$. As thus far described it will be evident that the vehicle serves its intended function as a means of transportation for passengers and that no attempt is made to restrain the frame movements. To do so involves structural requirements of strength, weight and re-enforcements. Practical requirements of transportation, however, demand that the passengers should be protected against the sun and weather and for that purpose some form of enclosure is employed. Body builders heretofore have imposed on this enclosure mechanical requirements to the end that it might serve as a re-enforcement for the frame and be sufficiently stout and durable to resist twisting stresses imposed thereon by the frame. Having once set out to attain this end they have constantly increased the rigidity and strength so that the least amount of noise and rattle would ensue during use, the paint would not crack and the seats would be suitably supported therefrom and in some cases serve as trusses to contribute to the rigidity. In accordance with the present invention it is proposed to enclose the seats $f$ with a flexible body which might best be likened to a canopy. Independent cross bows $g$ which are themselves flexible and light are supported from the floor by any convenient means. Since it is not proposed to have any parts rigidly tied in with the floor these bows may be conveniently mounted on rails $h$ disposed along the opposite side edges of the planks $e$ and be embraced by clamping pieces $g'$ on the lower ends of the bows. Turn buckles $i$ on spacer rods $i'$ may serve as a convenient means of maintaining the bows in spaced relationship commencing, for instance, from the rearmost bow which itself may be secured against endwise movement on the rails by any convenient means such as pins $g^2$ engaging with the rails, respectively. On the outside of the bows may be stretched suitable flexible fabric covering $k$ which may be of waterproof material and may extend from one side of the flooring up over the bows and down to the other end but anchored by the lacing $k'$ extending from its lower edges to the side frame members $a$. The rear wall of the body $k^2$ may be directly engaged with the end bow $g$ and secured thereto by tacking or lacing as shown particularly in Figure 5. Within the fabric covering and extending nearly between adjacent bows may be sheet metal plates $l$ one edge of which may be secured to the one bow and the other edge of which may be free to move with respect to the adjacent bow while guided thereby. Between this sheet metal plate and the fabric may, if desired, be interposed some stuffing. Such a sheet metal lining affords some security to the passengers against blows or collisions but does not affect the non-rigid character of the canopy. Between the bows at suitable points may also be incorporated windows $m$ which themselves will preferably be of flexible material and maintained in place by stitching. These windows in the illustrated construction are disposed immediately above the sheet metal plates between the bows. A door in the form of a closure for an opening in the canopy through which passengers may have ready ingress and egress is indicated as a flexible member $n$ set between any two of the bows $g$, usually at the forward end of the vehicle. This door may be built up on a frame work such as is illustrated in Figure 6 wherein opposed channels $n'$ are enclosed by resilient flexible tubing $n^2$ which may be of rubber around which the same flexible fabric as is used for the remainder of the body may be laced. The door as thus constructed may have flexible transparent panes $m'$ stitched therein and is altogether yielding so as to impress no restraint on the canopy covering considered as a whole. Any suitable hinge connection may be interposed operatively between the door and the adjacent bow $g$, the free edge of the door being adapted to form a tight closure with the adjacent bow.

The description should make clear the means by which the essential characteristics pointed out at the beginning of this specification are realized. The claim appended hereto contemplates departures in matters of design and form.

What I claim is:

In a self-propelled vehicle, in combination with supporting road wheels a relatively flexible frame carried thereon, flooring carried with the frame, a plurality of cross bows, a non-rigid connection between the ends of the bows and the floor, means to maintain said bows in predetermined spaced relationship, and a light flexible covering secured over the bows, inflexible metal plates secured along one edge to the respective bows and mounted back of the flexible covering, the other edges of said plates being free.

This specification signed this 16th day of May, A. D. 1924.

ALFRED F. MASURY.